United States Patent

Saupe

[15] 3,665,606
[45] May 30, 1972

[54] COUPLING FOR THE CONNECTION OF A DENTAL HANDPIECE TO A POWER SOURCE

[72] Inventor: Martin Saupe, Mittelbiberach, Germany
[73] Assignee: Kaltenbach & Voigt, Biberach/Riss, Germany
[22] Filed: Apr. 2, 1969
[21] Appl. No.: 812,785

[30] Foreign Application Priority Data
Jan. 27, 1969 Germany..................G 69 03 033.7

[52] U.S. Cl.................................................32/26
[51] Int. Cl.............................................A61c 1/08
[58] Field of Search..................285/7, 317; 32/27, 26

[56] References Cited

UNITED STATES PATENTS

| | | | |
|---|---|---|---|
| 641,006 | 1/1900 | Geddes | 32/26 |
| 1,063,282 | 6/1913 | Northrop | 32/26 |
| 2,516,883 | 8/1950 | Kelly | 285/7 |
| 3,432,194 | 3/1969 | Garnier | 285/7 |

*Primary Examiner*—Robert Peshock
*Attorney*—Waters, Roditi, Schwartz & Nissen

[57] ABSTRACT

A sleeve of a dental handpiece is connected directly or via an intermediate sleeve to a drive motor by means of the engagement of a hook, mounted on an elastic arm secured to the motor, in an annular groove formed in the sleeve. The hook is selectively displaced from the groove to uncouple the sleeve and motor by axially displacing a shift member, externally mounted on the sleeve, which causes a sliding ring connected with the shift member to pass over the hook and displace the same from the groove against the opposition of the resilient arm.

9 Claims, 1 Drawing Figure

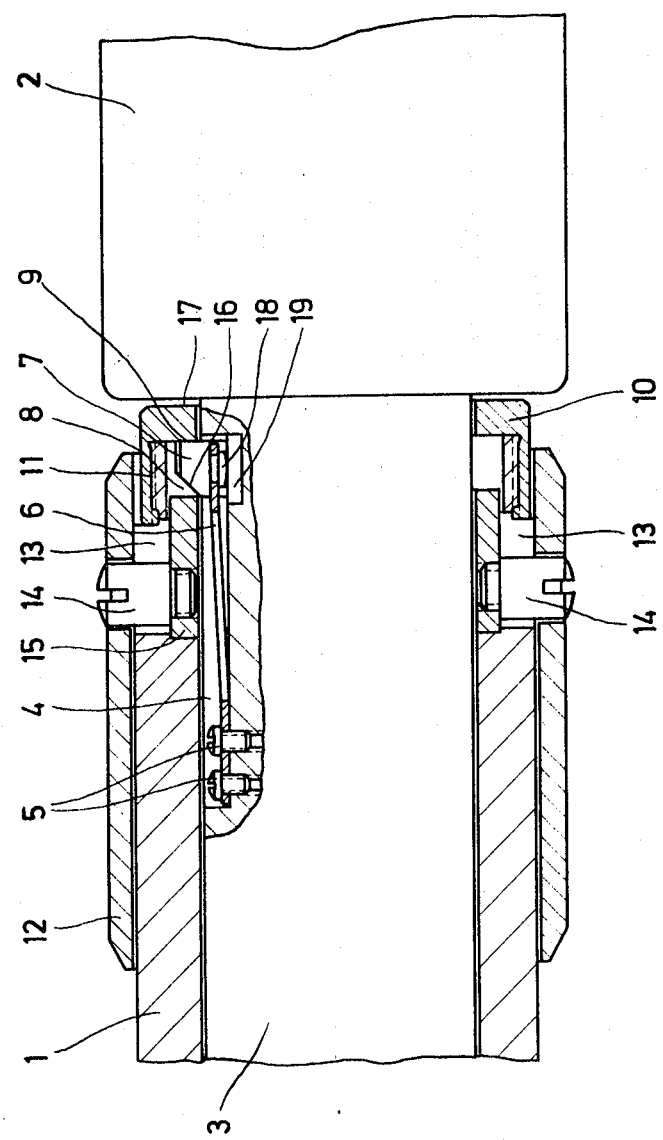

COUPLING FOR THE CONNECTION OF A DENTAL HANDPIECE TO A POWER SOURCE

BRIEF SUMMARY OF THE INVENTION

The invention relates to a coupling for the connection of a dental handpiece, preferably via an intermediate sleeve, to a micromotor, by means of a spring-action coupling hook supported in an external longitudinal groove of a slide-connection sleeve fixedly attached to the motor, the hook having a nose engaging in a recess of the handpiece, or its intermediary sleeve. A coupling of this kind can be utilized for straight handpieces, as well as for contro-angle handpieces.

In a known coupling of the aforementioned type, a perforation, or hole-like recess is provided in the sleeve of the handpiece for engagement by the nose of the coupling hook. This configuration does not permit any relative rotation between the handpiece and motor, as is often desired by the dentist while treating a patient. On the other hand, it becomes necessary to search for the hole-like recess in order to engage the coupling hook and this is complicated, tedious and time-consuming.

An object of the invention is to provide a coupling of the general class described, but which permits easy engagement of the nose of the coupling hook with the recess, as well as relative rotary movement between the handpiece and motor, whenever that is desired by the dentist.

For achieving this objective, there is provided on the handpiece, or intermediate sleeve, an external, axially movable shift sleeve for disengaging the coupling hook, said shift sleeve being attached, by at least one pin traversing an elongated hole in the handpiece sleeve, to a sliding ring, whose frontal surface facing the motor delimits on one side the recess for the nose of the coupling hook, which recess, is constituted as an annular groove, whereas the nose of the coupling hook, for the purpose of being forced out from the annular groove when the sliding ring is moved towards the motor, is provided, at least on the surface facing the sliding ring, with a taper, or chamfer.

Thanks to the above configuration, it becomes possible to realize a connection between the motor and the handpiece sleeve, or intermediary sleeve regardless of the angle of rotation of either element, since engagement of the nose of the coupling hook in the annular groove can always be effected when said elements are pushed towards each other. On the other hand, said configuration of the groove, permits rotation of the sleeve and the motor relative to each other.

In further accordance with the invention, the other surface of the annular groove is formed by a wall of a cap screwed onto the handpiece sleeve, or intermediary sleeve at the end thereof closest to the motor.

BRIEF DESCRIPTION OF THE DRAWING

The sole figure of the drawing is a sectional view, partly broken away, of a coupling for a dental handpiece in which the handpiece is coupled to a drive motor.

DETAILED DESCRIPTION

A sleeve of a dental handpiece, or an intermediate sleeve, is designated as 1 in the drawing, and this sleeve is coupled to a dental micromotor 2. This micromotor may be an electric motor, a turbine, or an air motor. Additionally, the invention also contemplates the connection of the sleeve to a spring-driven, articulated slide connection.

From the frontal surface of the micromotor 2 facing the sleeve 1 there extends a slide-connection sleeve 3, in which the drive shaft of the micromotor is supported in a known manner, and which is not shown in the drawing as this forms no part of the invention. The slide-connection sleeve 3 possesses an external longitudinal groove 4, in which a spring-loaded coupling hook 6 is attached to sleeve 3 by means of screws 5. The coupling hook 6 has a nose 7, which engages in a recess 8, which is constituted as an annular groove in the sleeve 1. In this arrangement, the boundary of recess 8 at the righthand side of the drawing, is formed by an annular wall 9 of a cap 10 which is threaded on the motor end of the sleeve 1. The outer surface of the protruding end of cap 10 may be provided with knurling (not shown) for facilitating its assembly and disassembly. The screw thread, by means of which the cap 10 is engaged on the sleeve 1, is designated as 11.

An axially movable shift sleeve 12 is arranged externally on the sleeve 1. The shift sleeve 12 is connected to a sliding ring 15 by means of two pins 14, each of which traverses an elongated hole 13 in the sleeve 1. The pins 14 are constituted as trunnion screws.

The face of the sliding ring 15 facing the micromotor 2 forms the second boundary of the recess 8, which is in the shape of an annular groove.

The nose 7 of the coupling hook 6 is provided with a tapered surface facing the sliding ring 15, in order that the latter, when moved towards the motor 2, will force the nose from the annular groove or recess 8. When the sliding ring 15 is moved towards the motor 2, the front face of the sliding ring 15 slides on the tapered surface 16, so that the nose 7 is forced out of the annular groove or recess 8, whereupon the inner wall of the sliding ring 15 maintains the nose 7 in its depressed position. This is possible, because, according to the invention, the length of the annular groove is sufficient to enable the sliding ring 15 to slide over and beyond nose 7. Thereby the sleeve 1 and motor are uncoupled and the handpiece, or the intermediate sleeve can be disassembled from the motor.

When reinserting the handpiece, or intermediate sleeve, the edge 17 of the cap 10 contacts tapered surface 16, causing depression of the nose 7 and with it the coupling hook 6, until the ring-shaped front face 9 of the cap 10 has passed the nose 7. Thereupon the nose 7 again becomes engaged in the annular groove 8 and the sleeve 1 and motor 2 are again coupled. For this purpose, it is necessary, that the shift sleeve 12 be initially brought to its lefthand end position, in the drawing, before the two elements 1 and 2 are slidably engaged.

In the embodiment represented, the nose 7 is attached to the resilient arm of the coupling hook 6 by means of a rivet 18. The slide-connection sleeve 3 is provided with an appropriate recess 19 for accommodating the rivet head in the uncoupled condition of sleeve 1 and motor 2 when nose 7 is depressed.

What is claimed is:

1. A coupling for a dental handpiece comprising a sleeve member, a drive member and coupling means releasably connecting the sleeve member and drive member, said drive member including a portion slidably engaged in said sleeve member, a first one of said members having an annular groove, the other member including a displaceable element extending into said groove and engaging said first member so as to connect said members together while enabling relative rotation therebetween, said displaceable element comprising a hook engageable in said groove and a resilient arm supporting said hook, and slidable means engaged with said members and adapted to contact said element for selectively displacing said element from said groove to uncouple said members, said slidable means comprising an axially movable shift sleeve and a sliding ring coupled to the shift sleeve for displacement therewith, said sliding ring bounding said groove to displace the hook therefrom, against the opposition of said resilient arm, as the shift sleeve is displaced.

2. A coupling as claimed in claim 1 wherein said one member is said sleeve member and said other member is the drive member, said slidable means comprising a pin connecting said shift sleeve and sliding ring, said sleeve member being provided with an elongated groove receiving said pin for displacement therein.

3. A coupling as claimed in claim 2 wherein said portion of the drive member is provided with an external longitudinal groove, said resilient arm being secured in said groove in said portion of the drive member.

4. A coupling as claimed in claim 3 wherein said axially movable shift sleeve is externally mounted on said sleeve member.

5. A coupling as claimed in claim 4 wherein said hook has a nose with a tapered surface facing said ring.

6. A coupling as claimed in claim 5 wherein said sleeve member comprises a cap thereon having a wall bounding said groove on a side thereof opposite said sliding ring.

7. A coupling as claimed in claim 6 wherein said cap is threadably engaged with said sleeve member.

8. A coupling as claimed in claim 5 wherein said groove in the sleeve member has a depth such that as the sliding ring passes into the groove the sliding ring passes over the nose and therebeyond to maintain the hook in a depressed position.

9. A coupling as claimed in claim 1 wherein said sleeve member and drive member are relatively rotatable when connected together by the coupling means.

* * * * *